United States Patent [19]

Cameron

[11] Patent Number: 5,062,662

[45] Date of Patent: Nov. 5, 1991

[54] VEHICLE SEATBELT HAVING AN INTEGRAL AIRBAG

[76] Inventor: Robert W. Cameron, 1321 King St., Bellingham, Wash. 98226

[21] Appl. No.: 524,161

[22] Filed: May 16, 1990

[51] Int. Cl.⁵ .............................................. B60R 21/18
[52] U.S. Cl. ..................................... 280/733; 280/801
[58] Field of Search ............... 280/733, 729, 728, 730, 280/731, 801, 802, 805, 803

[56] References Cited

U.S. PATENT DOCUMENTS

| | | | |
|---|---|---|---|
| 3,929,205 | 12/1975 | Takada | 280/733 |
| 3,933,370 | 1/1976 | Abe et al. | 280/733 |
| 3,953,640 | 4/1976 | Takada | 280/733 |
| 3,970,329 | 7/1976 | Lewis | 280/733 |
| 3,971,569 | 7/1976 | Abe et al. | 280/733 |
| 3,975,037 | 8/1976 | Hontschik et al. | 280/733 |
| 4,348,037 | 9/1982 | Law et al. | 280/733 |
| 4,971,354 | 11/1990 | Kim | 280/733 |

FOREIGN PATENT DOCUMENTS

| | | | |
|---|---|---|---|
| 2116094 | 10/1972 | Fed. Rep. of Germany | 280/733 |
| 2145050 | 4/1979 | Fed. Rep. of Germany | 280/733 |
| 8807947 | 10/1988 | PCT Int'l Appl. | 280/733 |
| 1332051 | 10/1973 | United Kingdom | 280/733 |
| 1416517 | 2/1975 | United Kingdom | 280/733 |

Primary Examiner—Kenneth R. Rice
Attorney, Agent, or Firm—Hughes & Multer

[57] ABSTRACT

A passenger restraint system for vehicles. A pouch containing an inflatable restraint bag is mounted to a seatbelt so that the pouch is positioned in front of a passanger when the belt is worn. There is an opening in the forward side of the pouch for permitting the bag to expand out of the pouch upon inflation. A flexible hose provides a conduit for supplying compressed air to the inflatable bag from a compressed air cylinder mounted to the vehicle body. A valve permits the air to flow from the cylinder through the hose to the bag in response to an impact received by the vehicle, so that the bag inflates and restrains the passenger against forward motion. The bag may be made of Kevlar ™, or may be provided with Kevlar ™ facings. The valve may be a lid positioned in the neck of the air bottle and held place by a pin and a hinge. The pin may be withdrawn by a solenoid actuated by a deceleration sensor so as to release the lid. Alternatively, an actuating member positioned in a bore may strike an end of the actuating member in response to the impact so as to move the actuating rod forward and out of the receptacle.

14 Claims, 3 Drawing Sheets

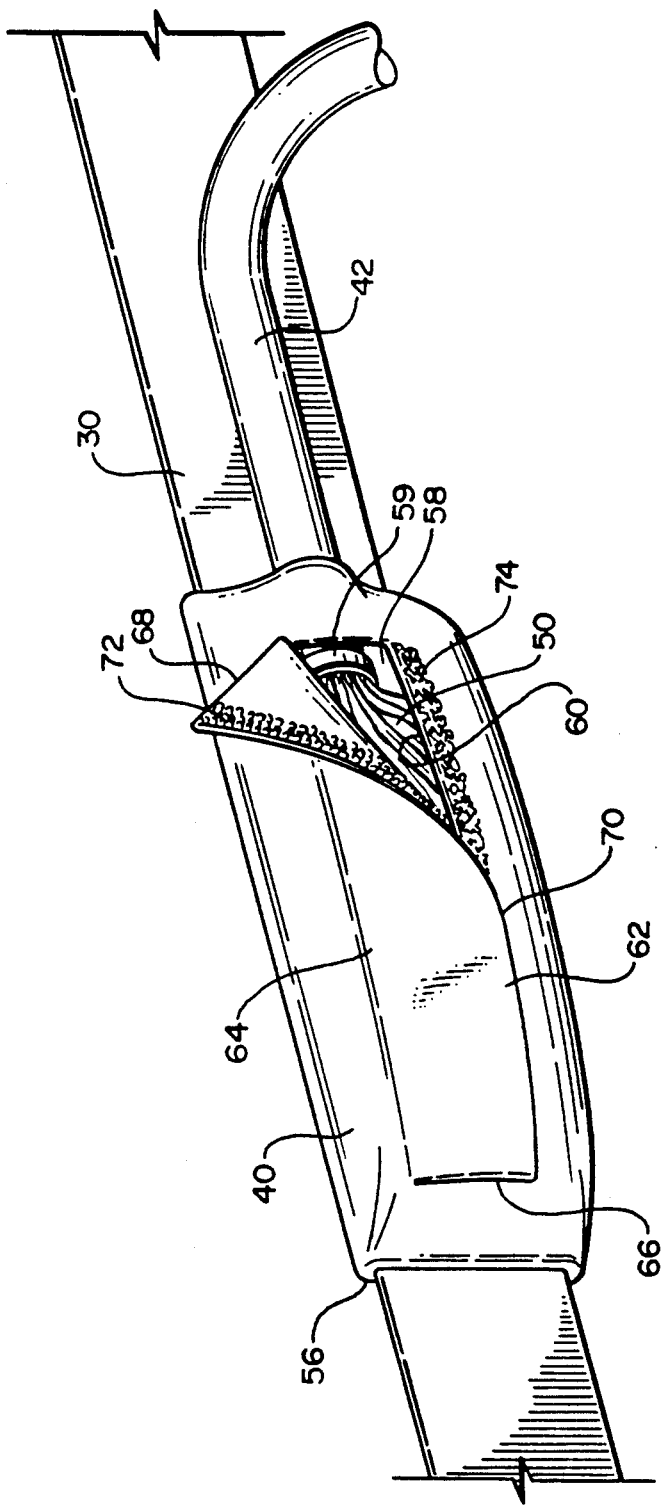

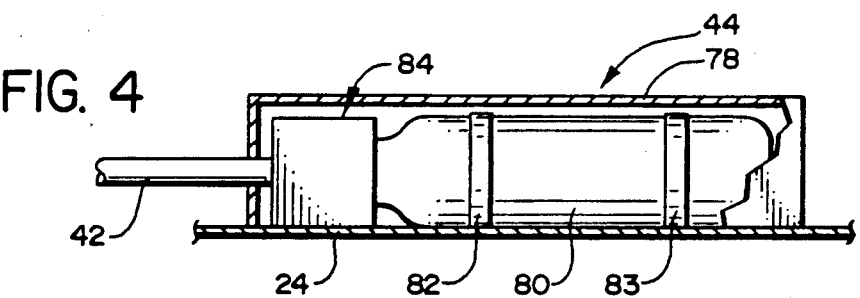
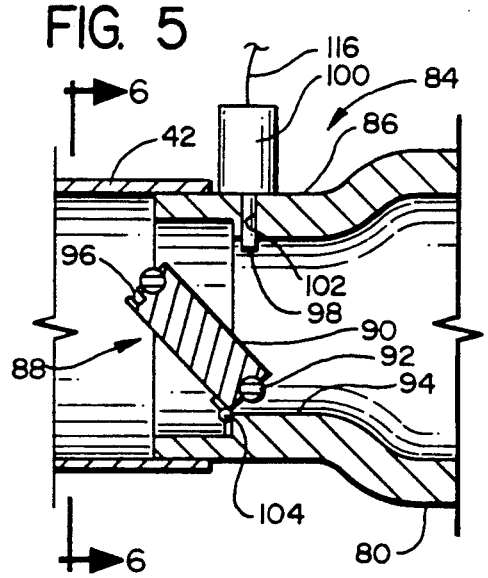
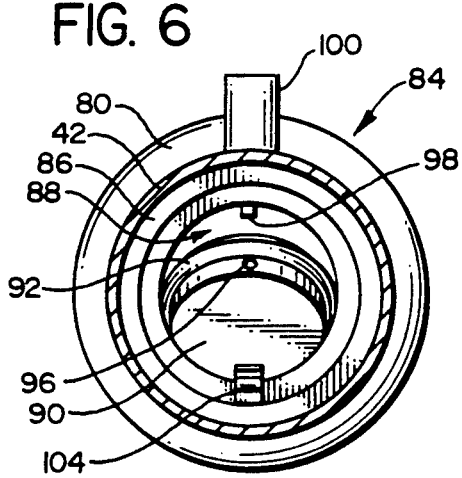
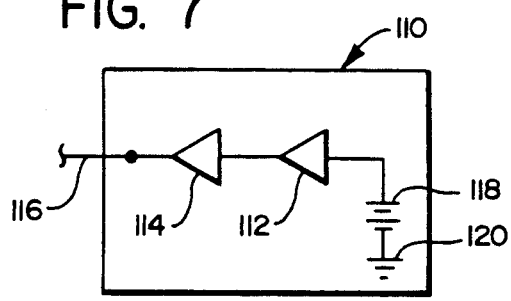
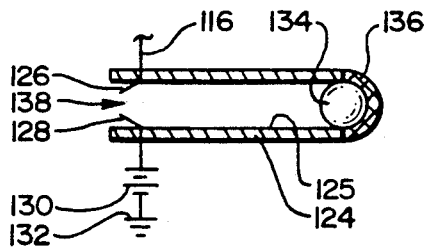
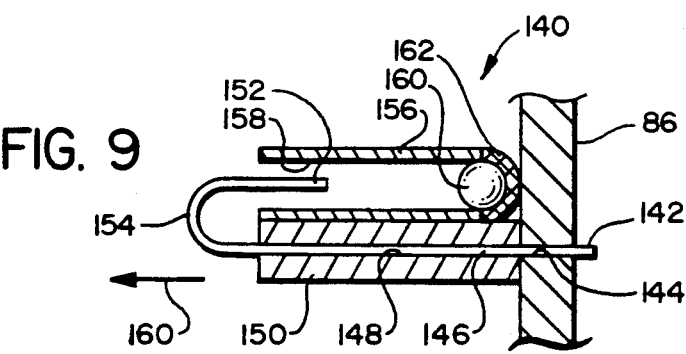

VEHICLE SEATBELT HAVING AN INTEGRAL AIRBAG

BACKGROUND OF THE INVENTION

1. Field of the Invention

The present invention relates generally to safety devices for the protection of occupants of moving vehicles. More particularly, the present invention relates to a seatbelt assembly having an integral airbag, and which is mountable in an automobile or the like.

2. Background Art

In recent years, the value of airbags which inflate in response to collisions to protect the occupants of automobiles and other moving vehicles has become widely recognized. Such airbags have proven highly effective in reducing the rate of injury to occupants of vehicles which are so equipped, particularly when such airbags are used in conjunction with conventional seatbelts, such as lap and shoulder belts.

Despite the fact that the benefits of such airbags are now well known, relatively few vehicles are provided with this equipment; for example, airbags have been installed in automobiles only during the most recent model years, and even then have been installed only in certain models. Furthermore, even in those models which are equipped with airbags, airbag protection is typically provided only for the driver; airbag installations for protection of front seat passengers are relatively rare, and are virtually nonexistent for rear seat passengers. Nevertheless, both of these groups of passengers are in need of protection by airbag installations; for example, the rear seat occupants of vehicles having only rear lap belts suffer a high incidence of spinal injuries which might be prevented by the use of airbags.

In a conventional automobile, the airbag protection for the driver is most typically installed in the hub of the steering wheel. The airbag itself is a folded, expansible, bag constructed of a suitable fabric. A solid rocket fuel charge is connected to communicate with the interior of the airbag. Upon impact, a firing circuit ignites the rocket fuel charge, which in turn very rapidly generates a gas discharge which fills the bag. The bag escapes from the steering wheel hub and expands in front of the driver, thereby cushioning the driver as he is thrown forward by frontal impact and preventing him from coming into contact with the hard interior surfaces of the vehicle. The airbag then quickly deflates so as to permit the driver to regain control of the vehicle (if it is still moving) and to facilitate egress from the vehicle. This arrangement, while it has proven highly effective in providing protection for the driver, does not lend itself to being retrofitted to vehicles which lack an original equipment airbag protection system. Similarly, the few existing passenger side airbag systems involve airbags mounted in or under the dashboard of the vehicle, which is once again an arrangement which is difficult to retrofit to older vehicles. Furthermore, it will be appreciated that in both of these conventional arrangements the airbag is necessarily positioned in front of the driver/passenger, which provides protection in the event of a frontal impact, but which provides limited, if any, protection in the event of a side impact.

Still further, although the airbag systems described above have proven highly effective in cushioning the impact of the passenger during an accident, there still exists the danger that materials may pierce the airbaq and impact the passenger's body. For examine, the steering column of the vehicle may be driven rearward through the airbag and into the body of the driver.

Accordingly, there exists a need for a system which can provide airbag protection for each of the occupants of the vehicle, including both the front and rear seat passengers as well as the driver. Furthermore, there is needed such a system which can be inexpensively retrofitted to older vehicles not having airbags installed as original equipment. Moreover, there is need for such an airbag system which reduces the risk of components of the motor vehicle penetrating the bag and coming into contact with the body of the passenger.

SUMMARY OF THE INVENTION

The present invention has solved the problems cited above, and comprises a passenger restraint device mountable in a vehicle having a seat for at least one passenger. The restraint device comprises a seatbelt for placement about the passenger in the seat, an inflatable restraint bag attached to the middle portion of the seatbelt so that the inflatable bag is positioned in front of the passenger when the seatbelt is worn, and means for inflating the restraint bag in response to a frontal impact received by the vehicle so that the restraint bag inflates and restrains forward motion of the passenger which results from the impact. The restraint bag may also be positioned and inflated so as to restrain motion of the passenger which results from a side impact or an impact from another direction.

The inflatable restraint bag may be contained in a pouch which is attached to the seatbelt so as to be in front of the passenger when the seatbelt is worn. There is an opening in front of the pouch for the bag to expand out of upon inflation. The opening is covered by a flap having an edge yieldingly secured to the pouch by a Velcro strip.

A flexible hose is attached to the inflatable bag in the pouch, and extends along the seatbelt. The second end of the flexible hose is attached to a discharge fitting of a compressed air cylinder mounted to the body of the vehicle. Valve means are provided for admitting the compressed gas from the cylinder into the hose in response to the impact so that the compressed gas is conveyed to the inflatable restraint bag.

The valve means may comprise a lid which is positioned in the bore of the discharge fitting of the compressed air cylinder so as to close the bore. The lid has a recess in its edge in which an actuating rod is received so as to maintain the lid in a closed position. Opposite the recess, a hinge is mounted to the lid and the cylinder so as to permit the lid to pivot out of the bore when released.

Means are provided for withdrawing the end of the actuating rod from the recess in the lid in response to an impact. The means for withdrawing the actuating rod may be a solenoid for moving the actuating rod when actuated and a deceleration sensor for actuating the solenoid in response to deceleration resulting from a frontal impact. The deceleration sensor may be a barrel member having a bore which is aligned in a forward-to-rearward direction, and having first and second electrical contacts in the forward end of the bore. A magnetic circuit closing member is mounted in the bore for longitudinal movement, and is retained in the rearward end of the bore by a magnet. The closing member is released in response to a frontal impact and moves to the forward end of the bore and so as to close the contact gap and actuate the solenoid. A barrel member having a bore aligned in another direction, such as a side-to-side direction, may be provided to actuate the solenoid in response to an impact in a side or other direction.

Alternatively, the means for withdrawing the end of the actuating rod from the receptacle in the lid may include an actuating rod which is bent 180°, so that the second end of the rod portion extends in a rearward direction. The second of the rod is received in a forward end of a bore which is aligned in a forward-to-rearward direction, and which has a magnetic actuating member positioned therein for longitudinal movement. A magnet retains the closing member in a rearward end of the bore under normal conditions, and releases the actuating member in response to the impact so that the actuating member moves to the forward end of the bore and strikes the second end of the actuating rod, moving the actuating rod forward and withdrawing the first end of the rod from the receptacle in the edge of the lid.

The inflatable restraint bag may be made of Kevlar TM or may be provided with Kevlar TM facings, so as to distribute the impact of the steering column or other components of the vehicle against the body of the passenger.

Other features of the present invention will become apparent from the following detailed description.

BRIEF DESCRIPTION OF THE DRAWINGS

FIG. 3 is a perspective view of a portion of the seatbelt and integral airbag of the present invention, showing the airbag retained within a storage pouch;

FIG. 4 is a cut-away side view of a high pressure air cylinder and valve assembly for inflating the airbag of FIGS. 1-3;

FIG. 5 is a side view of a section through a portion of the air cylinder and valve assembly of FIG. 4, showing the valve thereof opening to release the compressed air into the airbag;

FIG. 6 is an end view of the valve shown in FIG. 5;

FIG. 7 is a diagram of a deceleration sensing circuit for actuation of the valve mechanism shown in FIGS. 5 and 6;

FIG. 8 is a side view of a section through another switch for actuation of the valve mechanism shown in FIGS. 5 and 6, here including a moving member for completing the actuation circuit;

FIG. 9 is a side view of a section through still another switch mechanism for actuation of the valve mechanism shown in FIGS. 5 and 6, here including a moving member which opens the valve through a mechanical linkage.

DETAILED DESCRIPTION OF THE INVENTION

Figure 1:
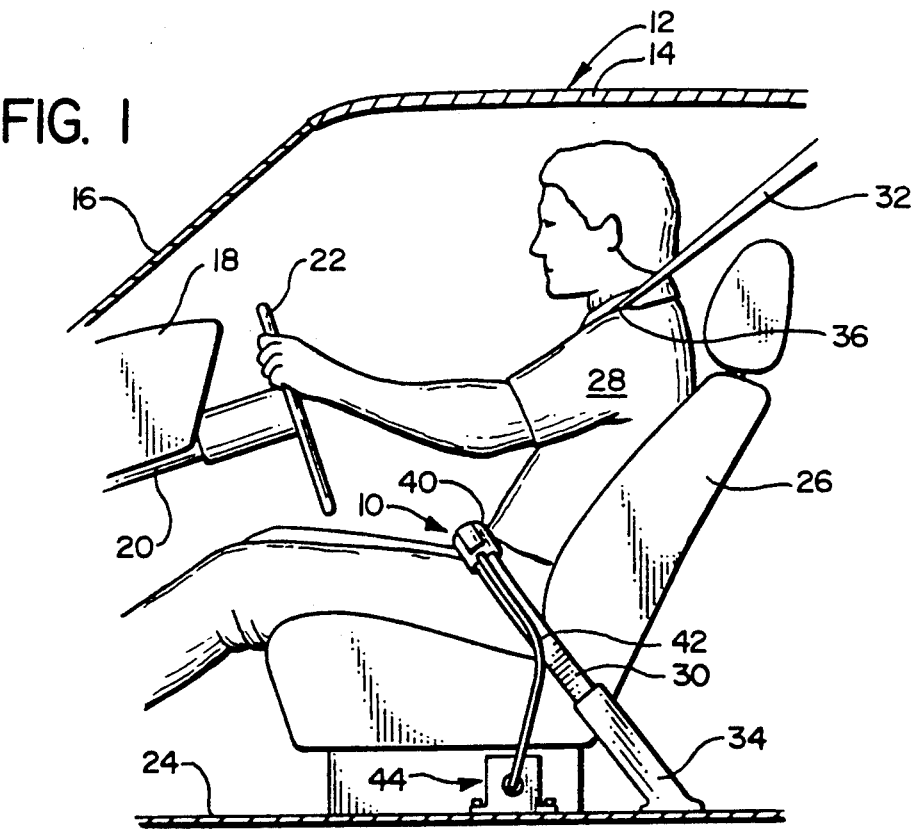
FIG. 1 is a side view of a section through an automobile having an occupant wearing a seatbelt having an integral airbag in accordance with the present invention, the airbag being in a nonactivated condition.

FIG. 1 shows a restraint system 10 incorporating the present invention mounted in a conventional automobile 12. Automobile 12 comprises in a conventional fashion a roof 14, a windshield 16, a dashboard 18, a steering column 20 protruding rearwardly from the dashboard and having a steering wheel 22 mounted thereon, and a floor board 24. A conventional, forward-facing seat 26 is mounted to the floor board, and, in the view shown in FIG. 1, a passenger 28 is seated in seat 26. Although restraint system 10 is shown mounted in a conventional automobile in FIGS. 1 and 2, it will be understood that the restraint system of the present invention may be mounted in any vehicle having suitable accommodations for passengers, such as, for example, a truck, an aircraft, a train, or the like.

Restraint system 10 comprises generally a lap belt 30 which is connected with a shoulder belt 32. Lap belt 30 and shoulder belt 32 are similar in general configuration to conventional lap and shoulder belts; accordingly, lap belt 30 has an end fitting 34 which is bolted to floor board 24 in a conventional location, and extends from the end fitting across the lap of the person wearing it. Similarly, shoulder belt 32 extends across the shoulder 36 of person 28 and has an end (not shown) which is connected to the bodywork of automobile 12 in an conventional location, or to a conventional retractor mechanism which in turn is mounted to the body work of automobile 12. Lap belt 30 and shoulder belt 32 are joined proximate a buckle (not shown) which secures the other ends of the belts to floor board 24 in a conventional manner.

Restraint system 10 further includes an airbag container 40 which is attached to lap belt 30 at a point at which container 40 will be approximately centered over the front portion of the person's body when the belts 30 and 32 are placed about the body of person 28 and buckled. Although airbag container 40 may preferably be positioned in front of the passenger, as shown, in order to protect the passenger in the event of a frontal impact, it may be desirable in some embodiments of the invention to position container 40 to the side of the body of the person to provide protection against side impacts or impacts from other directions. Furthermore, it may be desirable to provide a plurality of airbag containers attached at various points along the seatbelts to provide protection against impacts from either front, side, or other directions.

An air hose 42, as will be described in greater detail below, connects the airbag in container 40 to air charge assembly 44. Air charge assembly 44 is positioned in the space beneath seat 26 and is bolted to floor boards 24. As will also be described in greater detail below, air charge assembly 44 serves to charge the airbag in pouch 40 with compressed air or other suitable gas so that it expands and protects the vehicle occupant in response to an accident.

The present invention accordingly provides a system which is easily installed in a conventional automobile which lacks an original equipment airbag system. Furthermore, the restraint system of the present invention can be installed to protect both front seat and rear seat passengers; the mounting points of belts 30 and 32 are generally the same as those for the standard original equipment seatbelts, and air charge assembly 44 is easily installed in space available beneath a conventional seat 26. If inadequate space is available beneath seat 26, air charge assembly 44 may be moved to any number of suitable mounting locations where space may be available, such as behind or in front of seat 26 or beneath floor boards 24, since the flexability of hose 42 permits it to be routed as needed from air charge assembly 44 to lap belt 32 and container 40.

Figure 2:
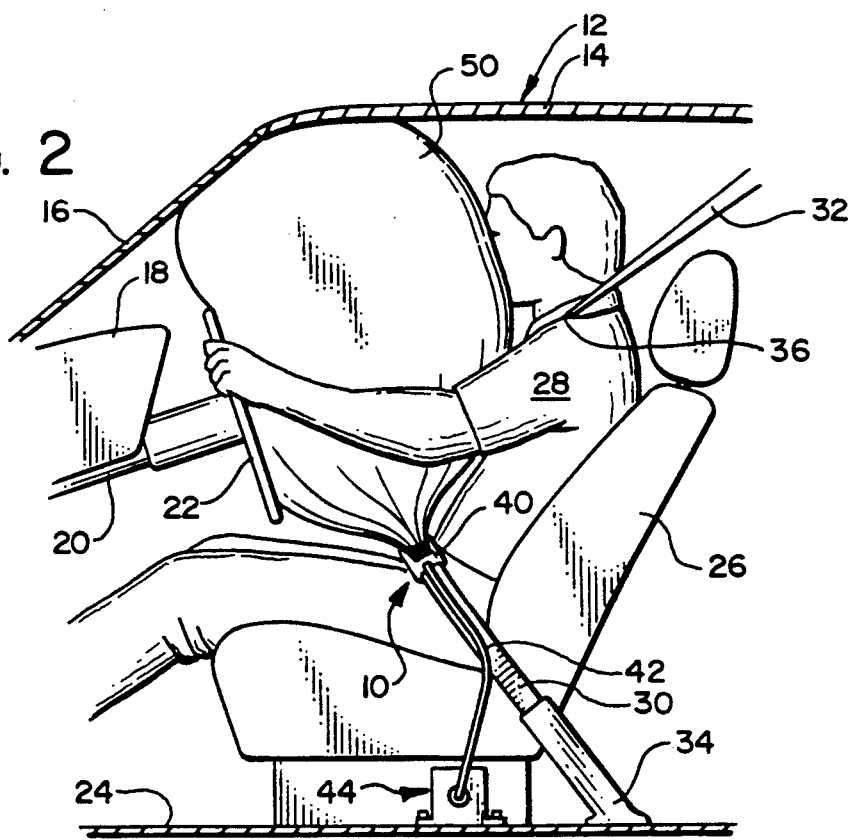
FIG. 2 is a side view of the automobile and occupant of FIG. 1, showing the airbag of the present invention inflating in response to an impact so as to protect the occupant.

FIG. 2 shows the restraint system 10 in an activated condition, as a result of an impact the impact, air charge assembly 44 supplies compressed air via air hose 42 to airbag 50, with the result that airbag 50 rapidly expands out of container 40. As discussed above, airbag container 40 is positioned in front of passenger 28; accordingly, airbag 50 expands outwardly from container 40 and upwardly between passenger 28 and steering wheel 22. Airbag 50 is thus positioned to restrain and cushion the forward motion of passenger 28 which results from the impact, and prevents passenger 28 from being thrown forward against steering wheel 22, dashboard 18, windshield 16, and other portions of the bodywork of automobile 12. Airbag 50 may also be sized sufficiently large to expand about passenger 28 and along his sides, so as to provide a degree of protection against side impacts. Furthermore, as noted above, the airbag may, in some embodiments, be positioned along the side of the passenger so as to expand between him and the side of the passenger compartment in the event of a side impact.

As noted above, the potential exists that the impact will drive steering column 20 rearward through the airbag and against the body of the passenger 28. Even if the steering column of other component does not actually pierce the material of an airbag, the concentrated impact may be transmitted directly through the material of a conventional airbag, so as to seriously injure the passenger. Airbag 50 of the present invention is preferably constructed of Kevlar TM fabric, or is constructed generally of a conventional fabric, such as nylon, with Kevlar TM fabric facings configured to be positioned in front of the passenger 28 When airbag 50 is inflated. Kevlar TM fabric is a woven aramid fiber having high strength, high modulus, and low flammability characteristics, which is woven and arranged in overlying layers so that the fibers stretch and transmit the impact along their lengths, distributing the impact throughout the material and spreading out the blunt trauma received by the person protected by the fabric so as to reduce the severity of the injury received by the person. Raw Kevlar TM fiber is available from E. I. Dupont deNemour & Company, Fibers Department—Laurel Run, Wilmington, Del., and is available as a woven fabric from a number of weavers, including, for example, Hexcel Corporation—Trevarno Division, 11555 Dublin Boulevard, Dublin, Calif. As used in this description and the appended claims, the term "Kevlar TM fabric" includes the impact-distributing material comprising layers of woven Kevlar TM aramid fiber, as described above, and any other fabric having suitable penetration resistance and impact distribution characteristics.

Immediately following the inflation of airbag 50 as shown in FIG. 2, a relief valve exhausts the air from airbag 50 so as to cause its rapid deflation. Such relief valves are well known to those skilled in the art, including, for example, mechanical relief valves which are held closed by the pressure of the incoming air and are then opened by spring pressure once the incoming air pressure drops off, and electrically-operated relief valves which operate on a time delay circuit. The rapid deflation of airbag 50 which is provided by the relief valve removes airbag 50 from in front of passenger 28, allowing him to regain control of the vehicle, if necessary, and facilitating his egress from the vehicle.

FIG. 3 shows airbag container 40 and air hose 42 attached to lap belt 30, prior to inflation of airbaq 50. Airbaq container 40 may be, as shown in FIG. 3, a pouch constructed of a suitable material, such as woven nylon fabric or the like. Airbag container 40 has a sleeve portion 56 which surrounds the webbing of lap belt 30 and may be stitched or otherwise attached thereto. Accordingly, airbag container 40 is securely attached to lap belt 30 so as to ensure that it is correctly positioned in front of the person's body when worn and does not slide longitudinally along belt 30.

Airbag container 40 defines an interior compartment 58 into which airbaq 50 is packed in its deflated state. FIG. 3 also shows a clamp 59 in compartment 58 which retains airbag 50 on the end of air hose 42 during the inflation process. Airbag 50 is folded or otherwise packed into compartment 58 so that it readily inflates and expands without impediment in response to air being supplied thereto through air hose 42.

An opening 60 is provided in the front of airbag container 40 so as to face away from the body of the person when the belt is worn. Opening 60 is sufficiently large to enable airbag 50 to expand rapidly therethrough without impediment during the initial stages of inflation. Opening 60 is closed by a closure flap 62, which in this case is a flap of the nylon cloth material of airbag container 40. Closure flap 62 has an upper portion 64 which is continuous with the remaining material of airbag container 40, and has side edges 66 and 68 and lower edge 70 which are separated from container 40 so as to be able to move outwardly therefrom in response to the initial expansion of airbag 50 in container 40. Lower edge 70 of closure flap 62 is provided with a strip of Velcro TM hooks 72 which engage a strip of Velcro TM loops 74 along the lower edge of opening 60. This arrangement ensures that flap 64 is kept closed under normal conditions, but readily releases from airbag container 40 when airbag 50 begins to expand. It Will be recognized that various other closure means may be utilized to keep closure flap 62 closed over opening 60 under normal conditions, yet which will release and enable airbag 50 to exit and expand through opening 60 when air is supplied thereto; for example, snap fasteners, magnetic fasteners, or the like, could be used in place of the Velcro TM fasteners shown. Accordingly, when air is supplied through airhose 42 to airbag 50 in the event of an accident, airbag 50 will expand initially in container 40, forcing flap 62 open, and will then exit from airbag container 40 through opening 60, so as to expand in front of the passenger 28 as shown in FIG. 2.

With reference now to FIGS. 4 through 6, air charge assembly 44 will be described in greater detail. FIG. 4 shows air charge assembly 44 mounted to a floor board 24 of an automobile. Air charge assembly 44 comprises generally an outer housing or case 78 enclosing a compressed air cylinder 80. Case 78 is preferably sufficiently strong and penetration resistant to prevent the escape of fragments of compressed air cylinder 80 or the like in the event of a rupture or accidental discharge of cylinder 80, so as to protect the occupants of the vehicle from injury. Compressed air cylinder 80 is secured against movement about the interior of case 78 by a pair of hold-down straps 82,83. The discharge end of compressed gas cylinder 80 is fitted with a valve assembly 84 for selectively releasing the compressed air from compressed air cylinder 80 into air hose 42, which extends outwardly from case 78.

Compressed air cylinder 80 may contain compressed atmospheric air of a pressure and volume sufficient to rapidly and fully inflate airbag 50 so as to protect the occupant 28. It will be understood, however, that compressed air cylinder 80 may contain any suitable compressed gas, such as, for example, compressed carbon dioxide, nitrogen, or the like. Furthermore, in some versions of the present invention, it may be desirable to use some means other than compressed gas for generating the gas charge for inflating airbag 50; for example, it may in some embodiments be desirable to employ a rocket fuel charge as previously described to supply gas through hose 42 to the belt-mounted airbag.

FIG. 5 shows the valve mechanism contained in valve assembly 84. Compressed air cylinder 80 is provided with a discharge neck 86 having a relatively large internal bore, as indicated generally by reference numeral 88, so that the compressed air can escape rapidly from compressed air cylinder 80 into air hose 42 when bore 88 is open. Under normal conditions, bore 88 is closed by a corresponding large diameter valve lid 90, which is sized to fit closely into bore 88. An "O"-ring 92 about the periphery of valve lid 90 abuts the inner surface of bore 88 so as to form an effective seal for preventing the escape of compressed air under normal conditions. The edge of lid 90 is provided with a recess 96, which is sized to receive an inner end of an actuator rod 98 of a solenoid 100. Actuating rod 98 passes through a cooperating bore 102 in the wall of cylinder neck 86, so as to be received in recess 96 under normal conditions. A hinge 104 is mounted to the edge of lid 90 diametrically opposite receptacle 96 hinge 104 is also mounted to neck 86 of cylinder 80, so that lid 90 can rotate about the axis of hinge 104 outwardly from compressed gas cylinder 80 when released.

Accordingly, when valve assembly 84 is in a normal, nonactivated condition, the first edge of lid 90 is secured against outward movement from compressed gas cylinder 80 by the abutment of actuating rod 98 With receptacle 96, and the other edge of lid 90 is secured against outward movement from cylinder 80 by hinge 104. When energized, solenoid 100 retracts actuating rod 98 through bore 102, withdrawing rod 98 from recess 96. Thus released, lid 90 is free to rotate about the axis of hinge 104 in response to the pressure differential between the compressed air in cylinder 80 and the noncompressed air in air hose 42. Lid 90 consequently pivots outwardly, opening bore 88 so that the compressed air in cylinder 80 is free to flow rapidly into air hose 42. Hinge 104, while permitting lid 90 to pivot, retains lid 90 and prevents it from traveling into and plugging air hose 42 or airbag 50, or from becoming a projectile under the force of the air expanding from cylinder 80.

FIG. 6 is an end view of the valve assembly 84 shown in FIG. 5, looking along line 6—6. Showing lid 90 opening as previously described.

A conventional pressure gauge may be provided at the exterior of housing 78 so that the air pressure in cylinder 80 can be periodically checked and cylinder 80 recharged or valve assembly 84 repaired as needed.

As one form of relief valve for deflating airbag 50 after its inflation, compressed gas cylinder may be provided with a second valve assembly for releasing the gas from the cylinder to the atmosphere when opened, and a solenoid in a time-delay circuit for opening the second valve assembly a short period after inflation of airbag 50.

FIG. 7 shows a circuit for actuating solenoid 100 so as to cause solenoid 100 to withdraw actuating rod 98 from lid 90 in response to an accident involving the vehicle having restraint system 10 mounted therein. FIG. 7 shows an actuator circuit 110 comprising generally a deceleration sensor 112 connected in series with an amplifier 114. Amplifier 114 is, in turn, connected by electrical lead 116 to solenoid 100. Deceleration sensor 112 is connected to the positive side of a battery 118, the negative side of battery 118 being connected to ground 120. Accordingly, when a predetermined rate of deceleration in a predetermined direction is sensed by deceleration sensor 112 as the result of a front end collision involving the vehicle, for example, a connection is made through deceleration sensor 112, causing the current to flow from battery 118 through electrical lead 116 to solenoid 100, Which is grounded through cylinder 80 to the vehicle body. This flow of current energizes solenoid 100, causing it to withdraw actuating rod 98 in the manner previously described.

FIG. 8 shows another form of decelerationsensing mechanism for actuating solenoid 100. FIG. 8 shows a barrel 124 in which there is a cylindrical bore 125 having a longitudinal axis which, in this embodiment, is aligned generally in a front-to-rear direction, in parallel with the normal (forward) direction of motion of the vehicle. Proximate the forward end of bore 125 is an electrical contact gap formed between a first electrical contact 126, Which is connected to electrical lead 116, Which in turn is connected to solenoid 100 as previously described, and a second electrical contact 128, Which is connected to the positive side o; a battery 130, the other side of battery 130 being connected to ground 132. A paramagnetic ball 134, made of an electricityconducting material such as steel, is mounted in chamber 124 near the rearward end thereof, and is held in position under normal conditions by a magnetic cup 136. Ball 134 is sized to act as a circuit closing member by bridging gap 138 in the event that ball 134 moves forward through chamber 124 into contact with electrical contacts 126 and 128. However, under normal conditions such as the normal deceleration and jarring which accompanies braking or operation of the vehicle over rough roads, or the bumping of the front or rear of the vehicle at very low speeds, magnetic cup 136 retains ball 134 in position in the rearward end of chamber 124, thus maintaining an insulating gap intermediate ball 134 and electrical contacts 126 and 128. When the vehicle is subjected to severe deceleration as a result of an accident, the momentum of ball 134 overcomes the magnetic attraction between ball 134 and magnetic cup 136, and carries ball 134 forward through bore 125 and into contact with electrical contacts 126 and 128. With the circuit thus completed, current flows from battery 130 to solenoid 100 through electrical lead 116, energizing solenoid 100 and causing it to withdraw actuating rod 98 from lid 90, as previously described.

FIG. 9 shows another form of mechanism for releasing lid 90 in the event of sudden deceleration of the Vehicle resulting from an accident. Reference numeral 140 indicates generally a mechanical release mechanism having an actuating rod 142, which, in substantially the same manner as actuating rod 98 shown in FIGS. 5 and 6, has a first end which passes through a cooperating bore 144 in neck 86 of compressed air cylinder 80, and which is received in a recess in the edge of the valve lid 90. A middle portion 146 of actuating rod 142 extends outwardly from neck 86 and passes longitudinally through a cooperating bore 148 in guide block 150. Guide block 150 may preferably be fabricated of a material having a suitably low coefficient of friction with the material of actuating rod 142. The second end 152 of actuating rod 142 extends outwardly from guide block 150 and has a 180° bend, so that second end 152 extends back parallel to middle portion 146 and first end 144. Second end 152 of rod 142 is positioned in the open forward end of a barrel 156 having a cylindrical bore 158. Bore 158 has an axis aligned generally with the normal, forward direction of motion of the vehicle, as indicated by arrow 160. In the rearward end of bore 158 is a steel ball 160 which is held in place under normal conditions by magnetic cup 162. In response to a frontal impact of sufficient magnitude, the momentum of ball 160 will overcome the magnetic attraction between ball 160 and magnetic cup 162, so that ball 160 travels in a forward direction through bore 158 and impacts the second end 152 of actuating rod 142. The impact of ball 160 with second end 152 causes rod 142 to move in a forward direction through bore 148 in guide block 150, withdrawing the first end of rod 142 from the recess in the edge of lid 90 so that lid 90 opens and releases the compressed air into air hose 42. Ball 160 is selected to have a sufficient mass to drive actuating rod 142 forcefully out of the receptacle in lid 90, overcoming the friction between the rod and the receptacle. Furthermore, ball 160, as well as ball 134 shown in FIG. 8, may be provided with some suitable configuration other than spherical; for example, ball 160 may be cylindrical or have any other shape which permits its longitudinal passage through bore 158.

As was noted above, the restraint device of the present invention may be mounted in a wide variety of passenger-carrying vehicles in addition to automobiles: the restraint device may also be configured to provide other forms of passenger protection in addition to motion restraint and cushioning upon impact. For example, in embodiments of the restraint system of the present invention which are mountable in aircraft, the inflatable restraint bag may be configured to provide a passenger flotation device in the event of an emergency water landing, the restraint system may be configured to inflate in response to either impact or manual actuation (by the passenger, or by a crewmember from a central station) and to detach from the body of the aircraft so that the passenger can exit the aircraft carrying the flotation device. In one version, the inflatable restraint bag may be provided with arm and/or head loops for securing the inflatable bag to the passenger in a suitable position for providing flotation. The seatbelt may be mounted to the body of the aircraft so as to restrain the passenger (in conjunction with the airbag) in the event of an impact, and may have a quick-release lever for detaching the belt from the body of the aircraft. In the event of a water landing, the passenger wearing the seatbelt may simply remove the inflatable bag from its pouch (if not already inflated) and place his head and/or arms through the loops in a manner similar to donning a conventional life preserver. The passenger may then detach the seatbelt, together with the compressed gas cylinder, and carry it from the aircraft, inflating the bag by means of a manually operated valve upon his entry into the water. Alternatively, the restraint bag may inflate in response to an impact and then be detached and carried from the aircraft, possibly in a partially deflated state so as to ease the passenger's egress from the aircraft.

The inflatable bag, when configured to provide a flotation device, may be provided with a mouth tube for manual re-inflation. Furthermore, particularly in embodiments in which the bag is inflated with compressed atmospheric air (or diver's air), the airbag may be provided with a suitably located mouth fitting for perm ting the passenger to breathe the air in the bag, so tl the inflated bag provides an emergency air supply 1 aiding the passenger in escaping from a smokefilled submerged aircraft.

The invention may be embodied in other speci forms without departing from the spirit or essent characteristics thereof. The present embodiment therefore to be considered in all respects as illustrati and not restrictive, the scope of the invention bei: indicated by the appended claims rather than by t foregoing description; and all changes which cor Within the meaning and range of equivalency of t claims are therefore intended to be embraced therein

What is claimed and desired to be secured by Lette Patent of the United States is:

1. A passenger restraint device mountable in a vehic having a seat for seating at least one passenger, sa restraint device comprising:

at least one safety belt for placement about said pa senger in said seat, said safety belt having first ar second ends anchorable to said vehicle and a mi dle portion configured to be positioned in front said passenger;

an inflatable restraint bag for restraining motion said passenger when inflated, said inflatable r straint bag being attached to said middle portion said safety belt so that said inflatable bag is pos tioned in a selected location relative to said passe: ger when said safety belt is placed about said pa senger;

a cylinder containing a compressed gas in an amoui sufficient to inflate said restraint bag, said con pressed gas cylinder having a neck portion havir a bore for permitting said compressed gas to flo therethrough;

a conduit for conveying said compressed gas fro1 said cylinder to said restraint bag, said condu being attached to said neck portion of said con pressed gas cylinder so that the interior of sai conduit is continuous with said bore in said neck ( said cylinder, a lid positionable in said bore in a first position i which said bore is closed by said lid so as to pr( vent said compressed gas from flowing from sai cylinder into said conduit, said lid having a rece: in an edge thereof;

a hinge mounted to said edge of said lid and said nec of said cylinder so as to permit said lid to pivc about said hinge from said first position in whic said bore is closed by said lid to a second positio in which said lid is removed from said bore so as t permit said compressed gas to flow from said cylii der into said conduit;

an actuating rod having a first end which is positio1 able in said recess in said edge of said lid so as t maintain said lid in said closed position; and means for withdrawing said first end of said actuatin rod from said recess in response to an impact s that said lid pivots about said hinge from said fir position to said second position so as to open sai bore and permit said compressed gas to flow fro1 said cylinder into said conduit.

2. The restraint device of claim 1, wherein said meai withdrawing said first end of said actuating rod fro1 said recess in said edge of said lid in response to sai impact comprises:

a solenoid mounted to said actuating rod for moving said actuating rod from a first position in which said first end of said rod is received in said recess in said edge of said lid to a second position in which said first end of said actuating rod is withdrawn from said recess in said lid, and a deceleration sensor electrically connected to said solenoid for actuating said solenoid to move said actuating rod from said first position to said second position in response to a predetermined rate of deceleration resulting from a said impact.

3. The restraint device of claim 2, wherein said deceleration sensor comprises:

a barrel member having a bore aligned in a forward-to-rearward direction;

first and second electrical contacts mounted in a forward end of said bore so as to form an electrical contact gap, at least one said electrical contact being connected electrically to said solenoid so that a circuit for actuating said solenoid is completed in response to closing of said contact gap;

a magnetic closing member positioned for longitudinal movement in said bore, said closing member being adapted to close said contact gap in response to movement of said closing member to said forward end of said bore; and a magnet mounted at a rearward end of said barrel member for retaining said closing member in a rearward end of said bore during normal operation of said vehicle and for releasing said actuating member in response to a said impact so that said closing member moves forward to said first end of said bore and closes said contact gap so as to complete said circuit for actuating said solenoid.

4. The restraint device of claim 1, wherein said actuating rod has a first portion which extends in a forward direction from said first end of said actuating rod and a second portion which is bent so that a second end of said actuating rod extends in a rearward direction, and said means for withdrawing said first end of said actuating rod from said recess in said edge of said lid comprises:

a barrel member having a tubular bore which extends in a forward-to-rearward direction, said tubular bore having a forward end in which said second end of said actuating rod is positioned;

a magnetic actuating member positioned for longitudinal movement in said tubular bore so as to strike said second end of said actuating rod in response to movement of said actuating member to said forward end of said bore; and a magnet mounted at a rearward end of said barrel member for retaining said actuating member in a rearward end of said bore during normal operation of said vehicle and for releasing said actuating member in response to a said impact so that said actuating member moves forward through said bore to said first end of said bore and strikes said second end of said actuating rod so as to move said actuating rod forward and withdraw said first end of said actuating rod from said recess in said edge of said lid.

5. A passenger restraint device mountable in a vehicle having a seat for seating at least one passenger, said restraint device comprising:

an inflatable restraint bag for restraining motion of said passenger when inflated, said inflatable restraint bag being mountable in said vehicle so that said inflatable bag is positioned in a selected location relative to said passenger;

a cylinder containing a compressed gas in an amount sufficient to inflate said restraint bag, said compressed gas cylinder having a neck portion having a bore for permitting said compressed gas to flow therethrough;

a conduit for conveying said compressed gas from said cylinder to said restraint bag, said conduit being attached to said neck portion of said cylinder so that the interior of said conduit is continuous with said bore;

a lid positionable in said bore in a closed position in which said bore is sealingly closed by said lid so as to prevent said compressed gas from flowing from said cylinder into said conduit;

means for positively retaining said lid in said closed position; and means for selectively releasing said lid from said closed position so that said lid is displaced from said bore by the pressure of said compressed gas so as to substantially completely open said bore to permit said compressed gas to flow from said cylinder into said inflatable restraint bag through said conduit.

6. The passenger restraint device of claim 5, wherein said means for retaining said lid in said closed position comprises: an engagement portion of said lid; and an actuating rod having a first end which is positionable in abutting engagement with said engagement portion of said lid so as to restrain movement of said lid against said pressure of said compressed gas.

7. The passenger restraint device of claim 6, wherein said means for selectively releasing said lid from said closed position comprises means for withdrawing said first end of said actuating rod from said abutting engagement with said lid.

8. The passenger restraint device of claim 7, wherein said means for withdrawing said first end of said rod from engagement with said lid is automatically operative in response to an impact of predetermined magnitude imparted to said vehicle by an accident.

9. A passenger restraint device mountable in a vehicle having a seat for seating at least one passenger, said restraint device comprising:

an inflatable restraint bag for restraining motion of said passenger when in an inflated condition, said inflatable restraint bag being configured to inflate from a deflated condition to said inflated condition within a predetermined period of time in response to a predetermined volume of gas being conveyed to the interior of said inflatable bag within said predetermined period of time;

a conduit for conveying said gas to said interior of said inflatable bag, said conduit having an internal passageway with a predetermined length and predetermined cross-sectional area;

a compressed gas cylinder for containing a predetermined volume of compressed gas at a predetermined pressure, said compressed gas cylinder having a neck portion connected to said conduit so that a bore through said neck portion of said cylinder is continuous with said internal passageway of said conduit, said bore being configured to have a length and cross-sectional area such that if said predetermined volume of compressed gas at said predetermined pressure is released to flow through said bore when said bore is substantially completely open, said predetermined volume of gas will flow from said cylinder and through said passageway in said conduit into said interior of said inflatable bag so as to inflate said bag within said predetermined time;

a lid mounted to said neck of said compressed gas cylinder so as to seal said bore and prevent flow of said compressed gas through said bore; and means for selectively releasing said lid so that said lid is displaced from said bore and said bore is substantially completely opened so as to permit said predetermined volume of gas to flow through said bore and said conduit to inflate said restraint bag from said deflated condition to said inflated condition within said predetermined period of time.

10. The passenger restraint device of claim 9, further comprising:

means for retaining said lid to said neck of said compressed gas cylinder following release of said lid so as to prevent said lid from being projected away from said cylinder by said flow of said compressed gas from said cylinder into said conduit.

11. A passenger restraint device mountable in a vehicle having a seat for seating at least one passenger, said restraint device comprising:

an inflatable restraint bag for restraining motion of said passenger when inflated, said inflatable restraint bag being mountable in said vehicle so that said inflatable bag is positioned in a selected location relative to said passenger, said restraint bag being constructed of a penetration-resistant fabric for preventing parts of said vehicle which may be dislodged in the event of an accident from penetrating said bag when inflated and coming into contact with said passenger;

a compressed gas cylinder containing a compressed gas in an amount sufficient to inflate said restraint bag;

a conduit for conveying said compressed gas from said cylinder to said restraint bag; and automatic means for releasing said compressed gas from said cylinder into said conduit in response to an accident involving said vehicle, so that said bag restrains motion of said passenger which results from said accident and prevents parts of said vehicle which are dislodged by said accident from penetrating said bag and coming into contact with said passenger.

12. The passenger restraint device of claim 11 wherein said bag is mountable in said vehicle so that said bag is positioned in front of said passenger when inflated.

13. The passenger restraint device of claim 12, wherein a said part of said vehicle dislodged by said accident is a steering column, and said inflatable restraint bag is configured to prevent said steering column from penetrating said bag when inflated and coming into contact with said passenger.

14. The passenger restraint device of claim 11, wherein said penetration resistant fabric is formed of aramid fibers woven and arranged in overlying layers so that said fibers stretch and transmit the impact of said vehicle parts along the lengths of said fibers so as to and so prevent direct transmission of said impact through said fabric to said passenger.

* * * * *